Figure 5:
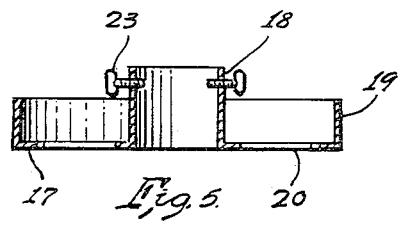

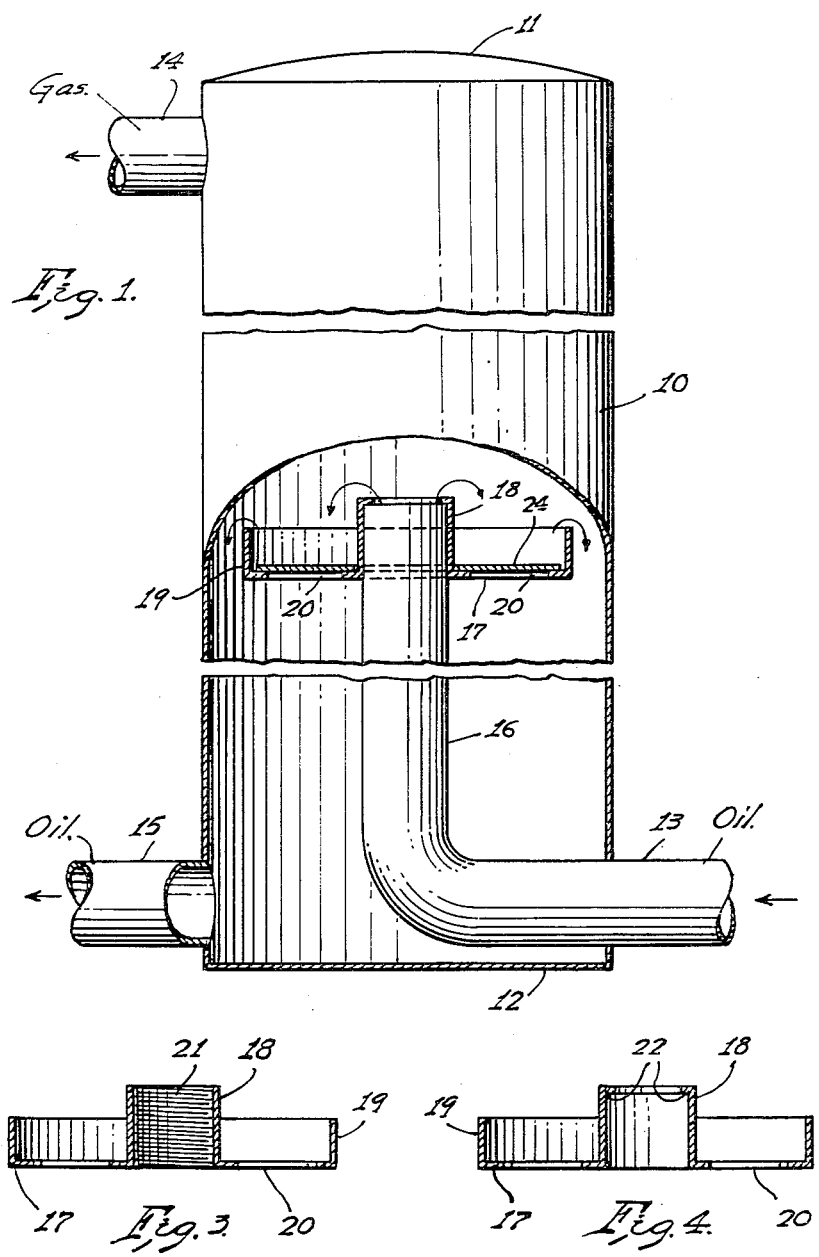

Dec. 18, 1956  H. H. WRIGHT  2,774,442
GAS SEPARATOR
Filed April 29, 1954  2 Sheets-Sheet 2

INVENTOR.
Harold H. Wright.
BY
ATTORNEY.

United States Patent Office 2,774,442
Patented Dec. 18, 1956

2,774,442
GAS SEPARATOR

Harold H. Wright, Tulsa, Okla., assignor to Gulf Oil Corporation, Pittsburgh, Pa., a corporation of Pennsylvania Application April 29, 1954, Serial No. 426,467

6 Claims. (Cl. 183—2.7)

This invention relates to gas separators, and more particularly to separators for disengaging gaseous hydrocarbons and water from liquid petroleum as they issue from an oil well.

Petroleum coming from the ground contains varied proportions of water and of lower boiling hydrocarbons such as methane, ethane, etc. Upon receipt in a gas separator positioned between the well and a receiving tank, or built integral with a receiving tank, a substantial amount of the occluded and dissolved gases are disengaged from the liquid stream. The lowering of pressure on the stream at this point tends to free additional gas. The amount of gas separable from the oil, and the means of its separation, vary considerably according to the character of the crude, the pressure existing at the level of its origin, temperature, and other variables. This invention is directed particularly to a device for separating gas from oil that contains a substantial amount of such material when at ordinary atmospheric pressure and temperature, including gassy oil of flow gravity and relatively high viscosity.

My device is also especially adapted to the separation of gas from BS&W emulsions. In the separation of these emulsions it is common to warm the oil to assist gravity separation of water and other foreign material, and this warming of the oil effects a substantial reduction in its viscosity and effects separation of a considerable portion of the occluded and dissolved gas. This warming of the oil with consequent separation of liquid from gas results in a frothy and foamy material which is thereupon advantageously circulated to and through a gas separator and receiving tank to separately obtain gas, liquid petroleum, and any accompanying water.

Separators to perform the above mentioned functions have heretofore been of rather standardized character. This standardized type has taken the form of an open shell into which is pumped the stream of material which is to undergo separation. Sometimes this is a cylindrical shell, closed at the head and at the bottom, and provided with an inlet connection somewhere near midway of its height, a gas outlet connection at or near the top, and a de-gassed oil outlet connection at or near the base. A common adaptation of this, ordinarily known as a gas stack is of substantially the same design except that the cylindrical shell is mounted directly on the roof of a receiving tank, and the roof is cut away to make an open connection between separator shell and tank. These devices of the prior art are of limited effectiveness, and the purpose of my invention is to provide a gas separator or gas stack of much greater efficiency.

Several embodiments of my invention are shown in the accompanying drawings, Figures 1 to 9, inclusive.

Referring to the accompanying drawings, Figure 1 is an elevation of my gas separator, with the outer shell partly cut away to show the interior arrangement. Numeral 10 indicates the cylindrical enclosing shell of the gas separator, partially cut away in front to show the interior arrangement. Numeral 11 indicates the head of the separator and 12 the base thereof. The separator has an inlet line 13 for the incoming stream of material to be separated, a gas outlet line 14 and a de-gassed oil outlet line 15. The oil inlet line 13 is shown entering the enclosing shell 10 near the bottom thereof, and terminating in a vertical riser 16. Positioned at the top of vertical riser 16 is tray 17 and pierced plate 24. In Figure 1, tray 17 is shown in a sectional view taken along line I—I of Figure 8.

Figure 2:
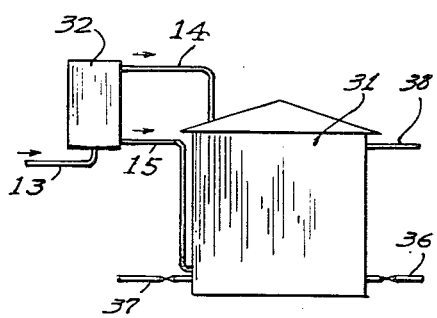

Figure 2 is a schematic representation of a receiving tank and gas separator, together with their various connections. In this figure, numeral 31 represents a receiving tank, and 32 is a gas separator. Oil from a producing well enters separator 32 through line 13, which terminates inside of the separator at a point intermediate of the height thereof. Separated oil and water flow from the bottom of gas separator 32 to a low point in receiving tank 31 through line 15, and the separated gas passes from the top of separator 32 into the top of tank 31 through line 14. The gas which enters the top of receiving tank 31 through line 14 subsequently leaves the receiving tank through line 38, extending from a high point thereof, or gas line 14 may go directly to other equipment without first entering tank 31. Separated liquid petroleum is removed from receiving tank 31 through valved line 36, and this line 36 is ordinarily connected inside of tank 31 to a "swing pipe" which can be raised or lowered to withdraw oil down to any desired level. In some cases the receiving tank has a section midway of its height packed with hay or wood excelsior or equivalent material to assist in breaking out emulsified oil, and in such case the oil outlet connection is at a high point in the tank, above the packed section, to permit removal of oil from the uppermost operating level. Separated water is withdrawn from the bottom of tank 31 through valved line 37, and this line ordinarily connects to an L and nipple inside of the tank which reach to the very bottom thereof and permit withdrawal of water therefrom.

Figure 8:
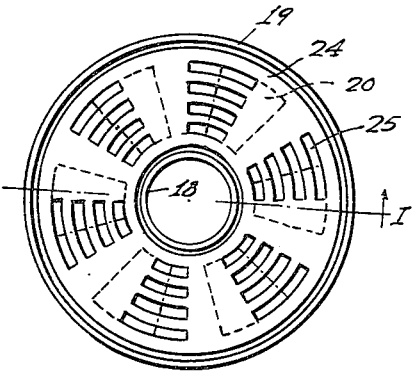
Figure 6:
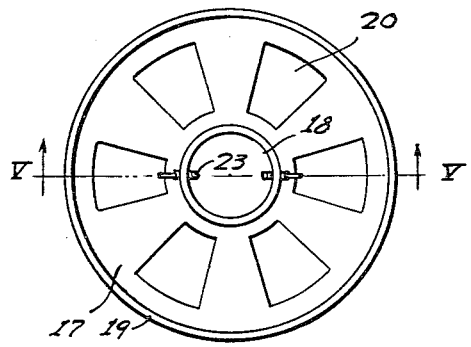
Figure 7:
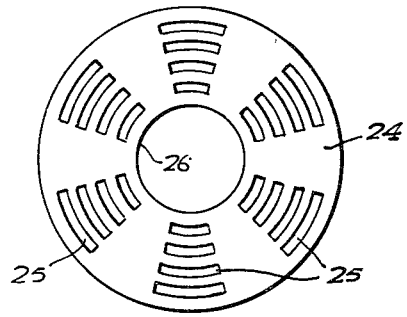
Figure 9:
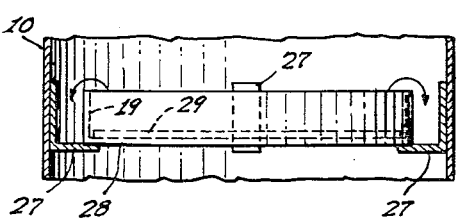

Figures 3, 4 and 5 are vertical sectional views taken through the axis of trays, hereinafter described, which constitute part of my invention. Figure 6 is a plan view of the tray shown in Figure 5. Figure 7 is a pierced plate which, in my invention, is positioned on the aforementioned trays. Figure 8 is a plan view of a tray, such as shown in Figures 3, 4, 5, and 6, together with an accompanying plate such as shown in Figure 7, the plate being rotated in the Figure to a position in which the pierced areas of the separate plate only partially coincide with the pierced areas of the tray. Figure 9 shows another form of tray, to be supported from the walls of the gas separator rather than in the manner of the trays shown in Figures 3, 4 and 5. This tray does not require the central collar 18 shown in Figures 3, 4, and 5, and the pierced areas 25 may be carried all the way in to the center of the tray.

Referring to Figures 1, 3, 4, 5 and 6, the numeral 17 indicates a tray, carrying a lip 19, and provided with a central sleeve 18 of sufficient internal diameter to fit around the top of riser 16 and provided with means of attachment thereto. The specific means of attachment shown in Figure 3 is an internal thread 21 on the inside of sleeve 18, for engagement with a threaded end on riser 16. Figure 4 shows an unthreaded sleeve 18 with an internal flange 22 at the top of the sleeve, permitting the tray to sit on the top of riser 16. The embodiment of my tray shown in Figure 5 is fitted with wing screws 23 for fastening the tray to the top of riser 16, and of course wing screws or screws of some other type could be used with the embodiment shown in Figure 4.

Referring to Figure 7, numeral 24 indicates a flat plate of slightly less diameter than the internal diameter of tray 17, having a central opening 26 of slightly greater diameter than the outside diameter of tray sleeve 18. Plate 24 is adapted to slip over the tray sleeve 18 and rest on the bottom of tray 17. Plate 24 has pierced areas 25 and the plate can be positioned in tray 17 in such a manner that the pierced areas 25 of plate 24 coincide with the pierced areas 20 of tray 17, or plate 24 can be rotated 30° therefrom to a position in which no portion of the pierced areas 25 coincide with the pierced areas 20, or plate 24 may be rotated to any intermediate position. The vertical positioning of plate 24 in tray 17 is indicated in Figure 1.

Figure 8 is a plan view of a tray, such as shown in Figures 3, 4 and 5, together with an accompanying plate 24 such as shown in Figure 7, the pierced areas of the separate plate being rotated to a position of partial coincidence with the pierced areas of the tray.

In the embodiment shown in Figure 9, the tray 28 is not supported from a riser 16, but instead the tray 28 is supported from several L-shaped lugs 27 fastened to the enclosing shell 10. Since tray 28 is not supported by a central riser 16, the tray does not have any central sleeve 18, and for the same reason plate 29 does not have a central opening 26. Otherwise tray 28 is similar to tray 17, and plate 29 is similar to plate 24. The pierced areas in tray 28 and its accompanying plate 29 may be identical with pierced areas 20 and 25 of Figures 6 and 7, and with either type of tray and plate the pierced areas may be of any other form that will permit the pierced areas of the tray and accompanying plate to be adjusted to full coincidence, zero coincidence, or to any degree of partial coincidence.

In the operation of my device, the oil charge entering through line 13 will arrive at the separator under some pressure, and there will ordinarily be a substantial decrease of pressure on the oil when it issues forth from riser 16 and spills into tray 17. I may use a single tray 17 or I may use a plurality of trays. In the latter case, the trays are mounted one above the other along riser 16, or are mounted on lugs 27 at different elevations. When a tray of the type shown in Figure 9 is used, the oil inlet line 13 enters the shell 10 at a point above the highest tray, and carries a terminal fitting such as an L which directs the oil down on the top tray. When a plurality of trays 17 are used on riser 16, trays with a bolt means of attachment, such as shown in Figure 5, are particularly adaptable for use below the top tray. In determining the position of the pierced areas 25 of plate 24 in respect to the pierced areas 20 of tray 17, consideration is given to the rate at which oil is entering the separator. I ordinarily find it advantageous to construct the trays of such diameter, in relation to the designed maximum flow of oil, as will cause a substantial flow of oil over the lip 19 throughout the periphery of tray 17 while the pierced areas 20 in tray 17 and the pierced areas 25 in plate 24 are in full coincidence. The separator is advantageously constructed of such diameter that there is a space of several inches between the lip 19 of the tray 17 and the adjacent shell 10. By changing the relative position of pierced plate areas 25 to pierced tray areas 20 I am able to greatly increase the area of the interface between oil and gas. While I desire to have oil overflowing lip 19 of tray 17 throughout the periphery of said tray, it is important that I adjust the plate 24 in tray 17 so as to hold down the rate of flow of oil over lip 19 to a point where it will fall as a sheet of liquid, with oil to gas interface on each side of the sheet, rather than to project the oil outward with such velocity that it will strike and flow down the adjacent shell 10. I desire to maintain maximum interface at all times between oil and gas, and that interface would be substantially reduced if the oil were permitted to flow down the face of the enclosing shell 10.

The positioning of the pierced areas 25 of plate 24 with respect to the pierced areas 20 of tray 17 is determined not alone to avoid excessive overflow of liquid at tray lip 19, but also to obtain maximum interface between oil and surrounding gas. For this purpose it is desirable to cause as much oil as possible to drain down through the pierced areas without unduly diminishing the quantity flowing over lip 19.

The purpose of the gas separator is to separate gas from the oil, and this separation results primarily from decrease of pressure on the oil at the point of discharge into the separator, from substantial reduction in the velocity of flow, from changes in direction of flow, and from presenting the greatest possible portion of the incoming stream at an interface between oil and gas. When circulating warmed BS&W through the separator, the increased temperature also is highly effective in freeing gas from the oil. Each of these factors characterizes my invention, and I have provided an apparatus in which their joint and inter-related action is effective to a remarkably high degree. By way of example I cite the following experience with separation of the stream from one group of wells. In this particular instance the gas and oil discharge lines from the gas separator were connected to a receiving tank in a common manner of construction. In that construction the separated oil line from the gas separator is connected into the tank at a low point and the separated gas line from the separator is connected into the top of the receiving tank. The receiving tank is provided at an intermediate portion of its height with a horizontal section packed with hay or excelsior or similar material to assist the separation of oil and water, particularly emulsions thereof, as the oil rises from its low point of entry to a discharge point near the top of the tank. Persistent trouble was experienced in the separation, with a conventional separator, of the stream from this particular group of wells. An unseparated mixture of oil and water and gas repeatedly went out of the gas separator through the gas outlet and entered the top of the receiving tank, above the packed section, thereby defiling the clean oil in the top of the receiving tank, and flowing therebeyond into the much larger stock tank and defiling the contents of that tank also. Had the gas from the outlet line of this conventional gas separator been used for fuel, as for a gas engine, the engine would no doubt have been seriously damaged when oil and water entered the cylinders. Had the gas been used for chemical processing or other similar purposes, great trouble would have been caused in subsequent portions of the system. With no change in the size of the separator or of its connecting lines, I installed therein the invention herein described and claimed, and the material discharged onto the tray was separated into its component parts at such an accelerated speed that the device was able to satisfactorily separate the full stream without any further overflowing of unseparated oil into the gas discharge line. Similar great increases in capacity and in thoroughness of separation have been consistently obtained in separating heated emulsions.

What I claim is:

1. In a device for continuously separating entrained and occluded hydrocarbon gases from crude petroleum comprising an enclosing shell, an inlet connection to said shell to permit the introduction thereinto of a mixed stream of liquid and gas, a connection from a high point of said shell to permit the discharge of separated gas therefrom, a connection from a low point of said shell to permit the discharge of liquid therefrom, the improvement which comprises: a tray positioned in said shell, laterally concentric therewith, spaced from the walls thereof, and vertically intermediate of the said inlet connection and the said liquid discharge connection; pierced areas in the deck of said tray; a movable plate positioned on the deck of the said tray, having pierced areas corresponding in position to those in the deck of the said tray, and rotatably movable over the deck of the said tray to vary the relative positions of pierced areas of tray and plate from full coincidence to zero coincidence.

2. In a device for continuously separating entrained and occluded hydrocarbon gases from crude petroleum comprising an enclosing shell, an inlet connection to said shell to permit the introduction thereinto of a mixed stream of liquid and gas, a connection from a high point of said shell to permit the discharge of separated gas therefrom, a connection from a low point of said shell to permit the discharge of liquid therefrom, the improvement which comprises: a tray positioned in said shell, laterally concentric therewith, spaced from the walls thereof, and vertically intermediate of the said inlet connection and the said liquid discharge connection; a raised rim around the periphery of the said tray, and pierced areas in the deck of said tray; a movable plate positioned on the deck of the said tray, having pierced areas corresponding in position to those in the deck of the said tray, and rotatably movable over the deck of the said tray to vary the relative positions of pierced areas of tray and plate from full coincidence to zero coincidence.

3. An unheated device for continuously separating entrained and occluded hydrocarbon gases from crude petroleum comprising a cylindrical enclosing shell; an inlet pipe positioned vertically in the cylindric enclosing shell; a connection from a high point of said shell to permit the discharge of separated gas therefrom; a connection from a low point of said shell to permit the discharge of liquid therefrom; a tray positioned in said shell, laterally concentric therewith, spaced from the walls thereof, vertically intermediate of the discharge point of the said inlet pipe connection and the said liquid discharge connection; a raised rim around the periphery of the said tray, and pierced areas in the deck of said tray; a movable plate positioned on the deck of the said tray, having pierced areas corresponding in position to those in the deck of the said tray, and rotatably movable over the deck of the said tray to vary the relative positions of the pierced areas of tray and plate from full coincidence to zero coincidence.

4. An unheated device for continuously separating entrained and occluded hydrocarbon gases from crude petroleum comprising a cylindric enclosing shell; an inlet pipe positioned vertically in the cylindric enclosing shell; a connection from a high point of said shell to permit the discharge of separated gas therefrom; a connection from a low point of said shell to permit the discharge of liquid therefrom; a horizontal tray fully surrounding and supported by said vertical inlet pipe, said tray being concentric with and spaced from the walls of the said cylindric enclosing shell and positioned vertically intermediate of the discharge point of the said inlet pipe connection and the said liquid discharge connection; a raised rim around the periphery of the said tray, and pierced areas in the deck of said tray; a movable plate positioned on the deck of the said tray, having pierced areas corresponding in position to those in the deck of the said tray, and rotatably movable over the deck of the said tray to vary the relative positions of the pierced areas of tray and plate from full coincidence to zero coincidence.

5. An unheated device for continuously separating entrained and occluded hydrocarbon gases from crude petroleum which comprises a vertical cylindric enclosing shell; a gas outlet connection from a high point of said shell; a liquid outlet connection from a low point of said shell; a tray positioned in said shell, concentric therewith, spaced from the walls thereof, and vertically intermediate the gas outlet connection and the liquid outlet connection; an inlet connection to said shell, positioned to discharge onto the deck of said tray; pierced areas in the deck of said tray; a movable plate positioned on the deck of the said tray, having pierced areas corresponding in position to those in the deck of the said tray, and rotatably movable over the deck of the said tray to vary the degree of coincidence of pierced areas of tray and plate.

6. An unheated device for continuously separating entrained and occluded hydrocarbon gases from crude petroleum which comprises an enclosing shell; a gas outlet connection from a high point of said shell; a liquid outlet connection from a low point of said shell; a tray positioned in said shell, spaced from the walls thereof, and vertically intermediate the gas outlet connection and the liquid outlet connection; an inlet connection to said shell, positioned to discharge onto the deck of said tray; pierced areas in the deck of said tray; a movable plate positioned on the deck of the said tray, having pierced areas corresponding in position to those in the deck of the said tray, and rotatably movable over the deck of the said tray to vary the degree of coincidence of pierced areas of tray and plate.

References Cited in the file of this patent

UNITED STATES PATENTS

| | | |
|---|---|---|
| 46,794 | Green | Mar. 14, 1865 |
| 781,453 | Organ | Jan. 31, 1905 |
| 1,095,463 | Kieser | May 5, 1914 |
| 2,060,242 | Pulley | Nov. 10, 1936 |
| 2,558,222 | Parkinson | June 26, 1951 |

FOREIGN PATENTS

| | | |
|---|---|---|
| 734,028 | Germany | Apr. 7, 1943 |